United States Patent
Lass et al.

(10) Patent No.: US 11,502,573 B2
(45) Date of Patent: Nov. 15, 2022

(54) MOTOR ENDSHIELD PROMOTING CONTROLLER AIR COOLING

(71) Applicant: Nidec Motor Corporation, St. Louis, MO (US)

(72) Inventors: David E. Lass, Addison, IL (US); Gregory A. Davis, Haubstadt, IN (US); Michael E. Williams, Princeton, IN (US); Dale R. Wilson, Princeton, IN (US)

(73) Assignee: Nidec Motor Corporation, St. Louis, MO (US)

( * ) Notice: Subject to any disclaimer, the term of this patent is extended or adjusted under 35 U.S.C. 154(b) by 288 days.

(21) Appl. No.: 16/847,295

(22) Filed: Apr. 13, 2020

(65) Prior Publication Data

US 2021/0320553 A1 Oct. 14, 2021

(51) Int. Cl.
*H02K 5/20* (2006.01)
*H02K 11/30* (2016.01)
*H02K 21/16* (2006.01)
*H02K 9/06* (2006.01)
*H02K 5/15* (2006.01)
*H02K 5/16* (2006.01)

(52) U.S. Cl.
CPC ............. *H02K 5/207* (2021.01); *H02K 5/15* (2013.01); *H02K 5/161* (2013.01); *H02K 9/06* (2013.01); *H02K 11/30* (2016.01); *H02K 21/16* (2013.01); *H02K 2205/09* (2013.01); *H02K 2211/03* (2013.01)

(58) Field of Classification Search
CPC . H02K 5/20; H02K 11/30; H02K 9/06; H02K 21/16
USPC ..................... 310/58, 60 R, 62–63
See application file for complete search history.

(56) References Cited

U.S. PATENT DOCUMENTS

| | | | |
|---|---|---|---|
| 10,164,505 B2 | 12/2018 | Lass et al. | |
| 2016/0079824 A1* | 3/2016 | McKinzie | H02K 9/227 310/58 |
| 2018/0263446 A1* | 9/2018 | Hayamitsu | F04D 25/082 |
| 2019/0081528 A1* | 3/2019 | Sawasaki | F16C 27/066 |

FOREIGN PATENT DOCUMENTS

JP 2015188279 A * 10/2015

* cited by examiner

*Primary Examiner* — Jose A Gonzalez Quinones
(74) *Attorney, Agent, or Firm* — Hovey Williams LLP (57) ABSTRACT

A motor assembly for powering a fluid blower includes a stator, a rotor rotatable relative to the stator about an axis of rotation, and an inner shell. The inner shell includes axially opposite first and second shell ends and encloses, at least in part, the stator and the rotor. An outer housing at least partly surrounds the inner shell such that an axially extending fluid channel is defined between the inner shell and the outer housing. A motor controller is positioned within the outer housing and is configured to control at least one operational parameter of the motor assembly. Furthermore, the motor assembly includes a flow-directing endshield located within the outer housing and adjacent the first shell end. The rotor is supported, at least in part, by the flow-directing endshield. The flow-directing endshield is fluidly interposed between the fluid channel and motor controller and is configured to direct a fluid flow between the fluid channel and the motor controller.

20 Claims, 10 Drawing Sheets

MOTOR ENDSHIELD PROMOTING CONTROLLER AIR COOLING

BACKGROUND

The embodiments described herein relate generally to an electric machine, and more particularly, to a motor assembly for powering a fluid blower where a fluid flow is used to cool the motor controller.

Electric motors are used in a variety of applications, including, for example, appliances (e.g., exercise bicycles, rowing machines, ceiling fans, dishwashers, washing machines, and vacuum cleaners) and vehicles (e.g., cars, trucks, and golf carts). Such motors typically include a control system that generates heat and/or is subjected to undesirably high environmental temperatures. It is therefore desirable in some instances to provide means for cooling at least some of the components of the control system.

SUMMARY

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

In one aspect, a motor assembly for powering a fluid blower is provided. The motor assembly includes a stator, a rotor rotatable relative to the stator about an axis of rotation; and an inner shell presenting axially opposite first and second shell ends and enclosing, at least in part, the stator and rotor. The motor assembly also includes an outer housing at least partly surrounding the inner shell such that an axially extending fluid channel is defined therebetween. A motor controller is positioned within the outer housing and configured to control at least one operational parameter of the motor assembly. A flow-directing endshield is located within the outer housing adjacent the first shell end, with the rotor being at least in part supported by the flow-directing endshield. The flow-directing endshield is fluidly interposed between the fluid channel and the controller. Furthermore, the flow-directing endshield is configured to direct a fluid flow between the fluid channel and the controller.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein. While the drawings do not necessarily provide exact dimensions or tolerances for the illustrated components or structures, the drawings are to scale with respect to the relationships between the components of the structures illustrated in the drawings.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made, without departing from the scope of the claims. The following description is, therefore, not limiting. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be clear to those skilled in the art from the description. For example, a feature, structure, act, etc. described in one embodiment may also be included in other embodiments but is not necessarily included. Thus, the present technology can include a variety of combinations and/or integrations of the embodiments described herein.

In the following specification and the claims, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and the claims, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "axial" and "axially" refer to directions and orientations extending substantially parallel to a longitudinal or rotational axis of the motor assembly. The terms "radial" and "radially" refer to directions and orientations extending substantially perpendicular to the rotation axis. The terms "tangent" and "tangential" refer to the directions and orientations extending substantially perpendicular to a radial direction of the motor assembly. In addition, as used herein, the terms "circumferential" and "circumferentially" refer to directions and orientations extending in the general direction around the rotation axis of the motor assembly (such references not being limited to pure circular extension or to the periphery or outer perimeter of the object unless the context clearly indicates otherwise). Moreover, directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

Example Electric Machine

Figure 1:
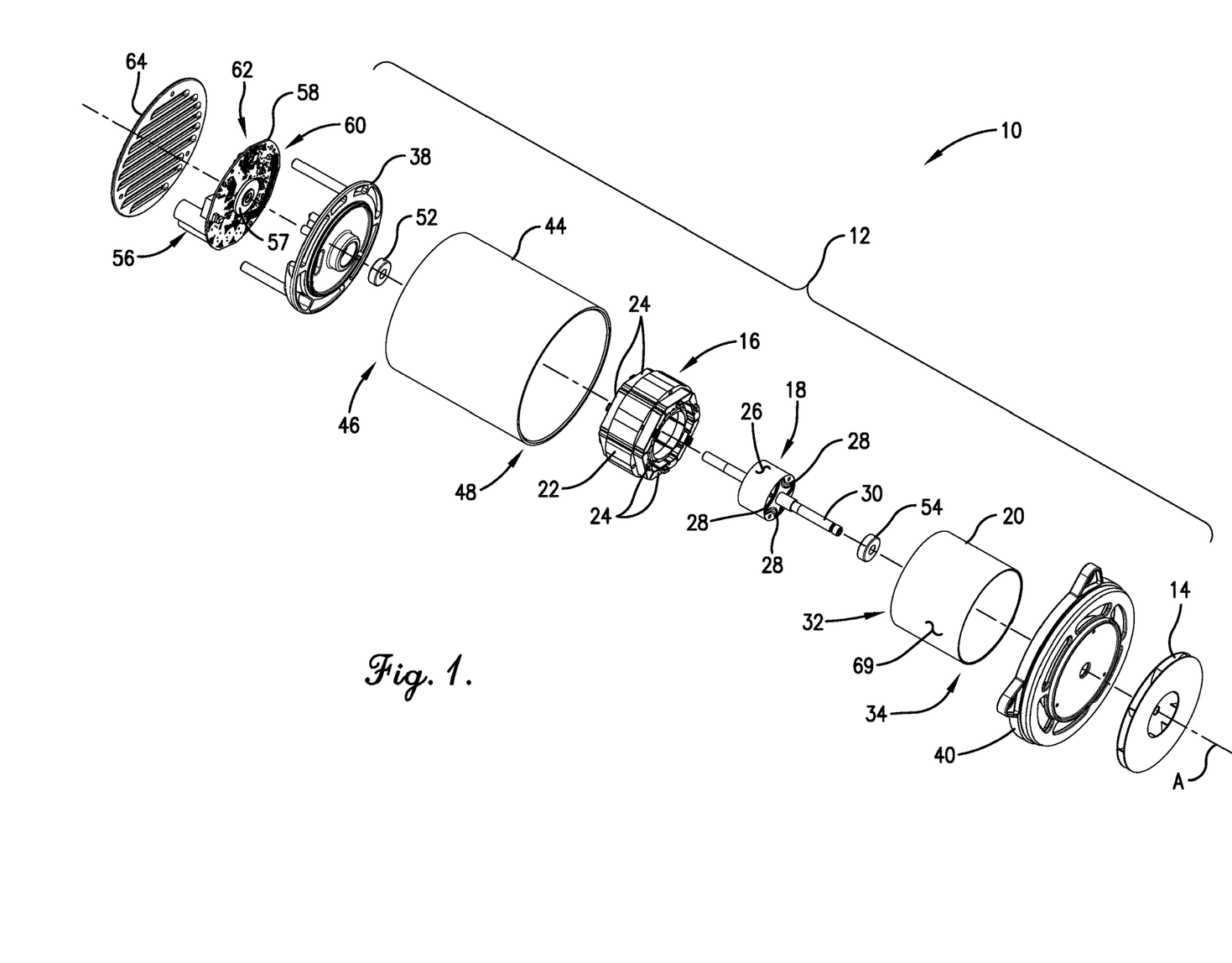
FIG. 1 is an exploded perspective view of an exemplary electric machine, in accordance with a preferred embodiment of the present invention.
Figure 2:
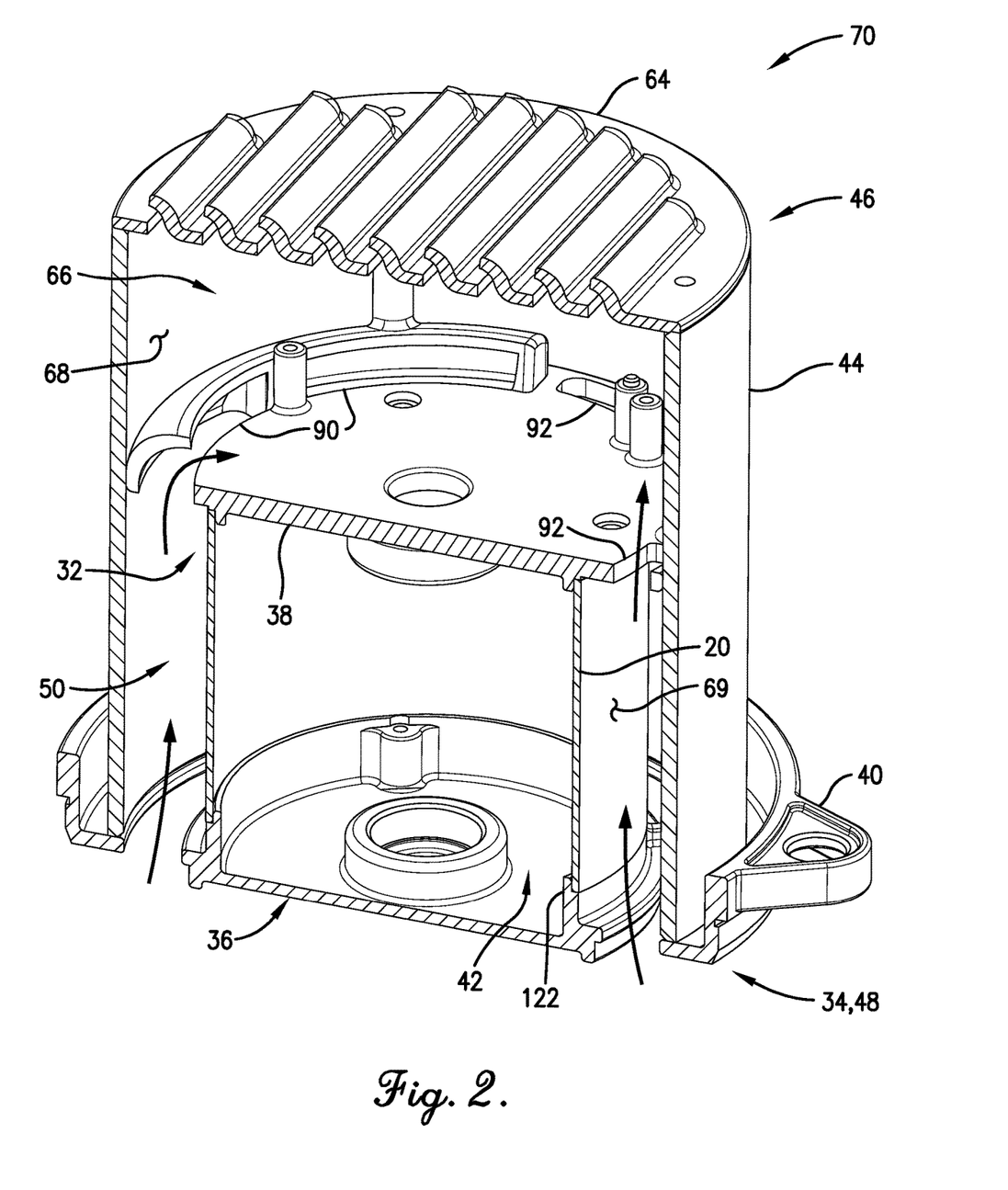
FIG. 2 is a sectional view of a housing assembly of the electric machine shown in FIG. 1.

FIG. 1 is an exploded perspective view of an exemplary electric machine 10, in accordance with one aspect of the present invention. FIG. 2 is a sectional view of a housing assembly 70 of the electric machine 10. In the exemplary embodiment, the electric machine 10 is a vacuum cleaner for use in a vehicle (preferably, a vacuum cleaner for use in an automobile), although use of the electric machine 10 in alternative applications and/or machines is contemplated with respect to certain aspects of the present invention.

In the exemplary embodiment, the electric machine 10 includes a motor assembly 12 coupled to a fluid blower 14. In an example embodiment, the blower includes, for example, a multi-stage blower having a plurality of blower wheels (not shown), each housed in respective stage housings (not shown). In other example embodiments, it is contemplated that any type of blower that enables the electric machine 10 to function as described herein may be used.

The motor assembly 12 is operable to rotate the blower 14 to generate a fluid flow. More particularly, as described in detail below, as the blower 14 is rotated by motor assembly 12, the blower 14 generates an exhaust fluid flow (preferably, a stream of air) directed toward the motor assembly 12. Alternatively, in certain aspects of the present invention, the fluid flow orientation of the motor assembly 12 relative to the blower 14 could be reversed, for example, where the motor assembly 12 is coupled to the intake side of the blower 14.

The motor assembly 12 broadly includes a stator 16 and a rotor 18 substantially enclosed within an inner shell 20. The rotor 18 is rotatable about an axis of rotation "A." In a preferred embodiment, the stator 16 at least substantially circumscribes the rotor 18, such that the motor assembly 12 is an inner rotor motor. An inner rotor motor preferably has magnets (not shown) positioned radially inward relative to the stator 16. However, according to other aspects of the present invention, the rotor and stator may alternately be constructed as an outer rotor motor and/or a dual rotor motor. In addition, the motor assembly 12 may be constructed for use in an electric generator or other electric machine that comprises a stator and rotor.

The stator 16 is generally toroidal in form and defines a stator axis that is coaxial with the axis of rotation "A." However, according to some aspects of the present invention, it is permissible for the axes to be non-coaxial.

The stator 16 preferably includes a stator core 22 and a plurality of coils (not shown) wound about the stator core 22. Furthermore, the stator 16 includes a plurality of electrically insulative coverings 24 positioned between the stator core 22 and the coils.

The stator core 22 preferably is fabricated from steel and may be of either solid or laminated construction. Alternatively, or additionally, the stator core 22 may be segmented in form. However, according to certain aspects of the present invention, the stator core 22 may be fabricated from any one or more of a variety of suitable materials and/or construction methods.

The stator core 22 preferably includes an annular yoke (not shown) and a plurality of arcuately spaced apart teeth (not shown) extending at least generally radially inward from the yoke. In the exemplary embodiment, the stator core 22 has six (6) teeth, such that the stator 16 is a six (6) slot stator. However, it is contemplated that the stator 16 can have any number of teeth/slots that enables the stator 16 to function as described herein. While not illustrated in FIG. 1, the plurality of coils (discussed above) are formed by electrically conductive wiring wound being about each of the teeth. The wiring encircles each tooth to form the coils, with each of the coils corresponding to one of the teeth. The wiring is preferably copper, although aluminum or any one or more of a variety of electrically conductive materials may be used without departing from the scope of the present invention.

The electrically insulative coverings 24 include a plurality of end caps. Additionally, or alternatively, use of any one or more of a variety of insulation means, including but not limited to the use of electrically insulative overmolding, powder-coating, inserts, and/or liners, is contemplated according to certain aspects of the present invention. Furthermore, it is contemplated that in some aspects of the present invention, the stator core 22 is devoid of electrical insulation. In the illustrated embodiment, the end caps (i.e., coverings 24) preferably include a substantially electrically insulative material. In a preferred embodiment, the end caps are fabricated from a synthetic resin. However, in certain aspects of the present invention, it is contemplated that any one or more of a variety of substantially electrically insulative materials may be used to fabricate the electrically insulative coverings 24 without departing from the scope of the present invention.

The rotor 18 is illustrated as a brushless permanent magnet rotor assembly. In the exemplary embodiment, the rotor 18 is includes a rotor core 26, a plurality of internally embedded magnets 28 fitted into magnet-receiving slots (not shown), and a shaft 30, which defines a rotational axis for the rotor. The rotational axis of the rotor 18 is coaxial with the axis of rotation "A."

The rotor core 26 is generally cylindrical in form and preferably is fabricated from steel. The rotor core 26 may be of either solid or laminated construction. Alternatively, or additionally, the rotor core 26 may be segmented in form. However, according to certain aspects of the present invention, the rotor core 26 may be fabricated from any one or more of a variety of suitable materials and/or construction methods.

The internally embedded magnets 28 are each preferably permanent magnets including neodymium or ferrite, although other magnet types and/or compositions are permissible according to certain aspects of the present invention. Furthermore, the internally embedded magnets 28 are preferably sized and shaped so as to at least in part complement the corresponding magnet-receiving slots.

In the exemplary embodiment, the rotor core 26 has four (4) internally embedded magnets 28, such that the rotor 18 is a four (4) pole rotor. However, it is contemplated that the rotor 18 can have any number of internally embedded magnets that enables the rotor 18 to function as described herein. Accordingly, in the exemplary embodiment, the motor assembly 12 is of a four (4) pole/six (6) slot construction. However, as described herein, it is contemplated that the motor assembly 12 can have any number of pole/slot configurations that enable the motor assembly to function as described herein.

As described above, the motor assembly 12 includes the inner shell 20. The inner shell 20 is generally cylindrical in shape and extends generally circumferentially about the stator 16. Alternatively, according to certain aspects of the present invention, the inner shell 20 may extend about the stator 16 in such a way as to provide one or more flat sides or to be otherwise alternatively shaped. In the exemplary embodiment, the inner shell 20 has an outer circumferential surface 69 and presents axially opposite first and second shell ends 32 and 34, respectively, and extends substantially continuously about the stator 16 and rotor 18 to enclose, at least in part, the stator 16 and rotor 18. However, according to certain aspects of the present invention, the inner shell 20 may include openings or slots therethrough. For example, in certain embodiments, one or more openings or slots may be provided to facilitate ventilation and/or access.

The inner shell 20 forms a portion of a motor case 36 of the motor assembly 12. The motor case 36 includes the inner shell 20, a flow-directing endshield 38, and a blower endshield 40 (broadly a second endshield). The inner shell 20, the flow-directing endshield 38, and the blower endshield 40, cooperatively define a motor chamber 42 that at least substantially receives the stator 16 and the rotor 18. More particularly, the flow-directing endshield 38 is positioned adjacent the first shell end 32 and coupled thereto. In addition, the blower endshield 40 is positioned adjacent the second shell end 34 and coupled thereto. Specifically, the inner shell 20 is coupled to and held in place between the flow-directing endshield 38 and the blower endshield 40 by a plurality of fasteners (not shown) extending between and coupled to the flow-directing endshield 38 and the blower endshield 40. It is contemplated that, in certain aspects of the present invention, the flow-directing endshield 38 and/or the blower endshield 40 may be located inwardly or spaced outward from the respective shell ends 32 and 34. That is, each endshield 38 and 40 is positioned adjacent or proximate the respective shell ends 32 and 40, in the manner that the endshields 38 and 40 are spaced axially apart with the flow-directing endshield 38 being located closer to first shell end 32 than the blower endshield 40, and the blower endshield 40 being located closer to the second shell end 34 than the flow-directing endshield 38.

The motor assembly 12 further includes an outer housing 44 at least partly surrounding the inner shell 20 such that an axially extending fluid channel 50 is defined therebetween. The outer housing 44 is generally cylindrical in shape and extends generally circumferentially about the inner shell 20. Alternatively, according to certain aspects of the present invention, the outer housing 44 may extend about the inner shell 20 in such a way as to provide one or more flat sides or to be otherwise alternatively shaped. In the exemplary embodiment, the outer housing 44 has an inner surface 68 and presents axially opposite first and second housing ends 46 and 48, respectively, and extends substantially continuously about the inner shell 20 to enclose, at least in part, the inner shell 20, stator 16, and rotor 18. However, according to certain aspects of the present invention, the outer housing 44 may include openings or slots therethrough. For example, in certain embodiments, one or more openings or slots may be provided to facilitate ventilation and/or access.

In the exemplary embodiment, as shown in FIG. 2, the first housing end 46 of the outer housing 44 extends axially beyond the first shell end 32 of the inner shell 20 to define a controller chamber 66 of the motor assembly 12. The second housing end 48 is coupled to the blower endshield 40 via a friction fit, although in certain aspects of the present invention, other methods of coupling the second housing end 48 to the blower endshield 40 are contemplated. As used herein, the phrase "friction fit" means a value of tightness between two components, i.e., an amount of clearance between the components. A negative amount of clearance is commonly referred to as a press fit, where the magnitude of interference determines whether the fit is a light friction fit or a friction fit. A small amount of positive clearance is referred to as a loose or sliding fit.

The motor assembly 12 includes first and second bearing assemblies 52 and 54 that cooperatively rotatably support the shaft 30 of the rotor 18. The flow-directing endshield 38 is configured to support the first bearing assembly 52, as described further herein, and the blower endshield 40 is configured to support the second bearing assembly 54, as described further herein. Alternative or additional bearing assembly supports may be provided without departing from the scope of the present invention.

Furthermore, in the exemplary embodiment, the motor assembly 12 includes a motor controller 56, positioned, for example, in the controller chamber 66. The motor controller 56 is configured for, at least in part, controlling at least one operational parameter of the motor assembly 12, including, for example, providing a means for starting and stopping the motor, selecting forward or reverse rotation, selecting and regulating the speed, regulating or limiting the torque, and protecting against overloads and electrical faults. The motor controller 56 includes a printed circuit board 58 (broadly a board) on which a plurality of electronic components are attached. The board 58 presents opposite first and second radially extending board sides 60 and 62.

In addition, the motor assembly 12 includes a vent plate 64. The vent plate 64 is configured to close the first housing end 46 of the outer housing 44. In particular, the vent plate 64 is positioned against the first housing end 46 and coupled to the flow-directing endshield 38 via a plurality of fasteners (not shown). Accordingly, as illustrated in FIG. 2, the housing assembly 70 includes the motor case 36 (including the inner shell 20, the flow-directing endshield 38, and the blower endshield 40), the outer housing 44, and the vent plate 64.

In the exemplary embodiment, as described above, the blower endshield 40 is coupled to the second shell end 34 and the second housing end 48. The flow-directing endshield 38 is coupled to the first shell end 32, holding the inner shell 20 in place between the flow-directing endshield 38 and the blower endshield 40. Furthermore, the vent plate 64 is coupled to the flow-directing endshield 38 such that the outer housing 44 is held between the blower endshield 40 and the vent plate 64.

Flow-Directing Endshield

Figure 4:
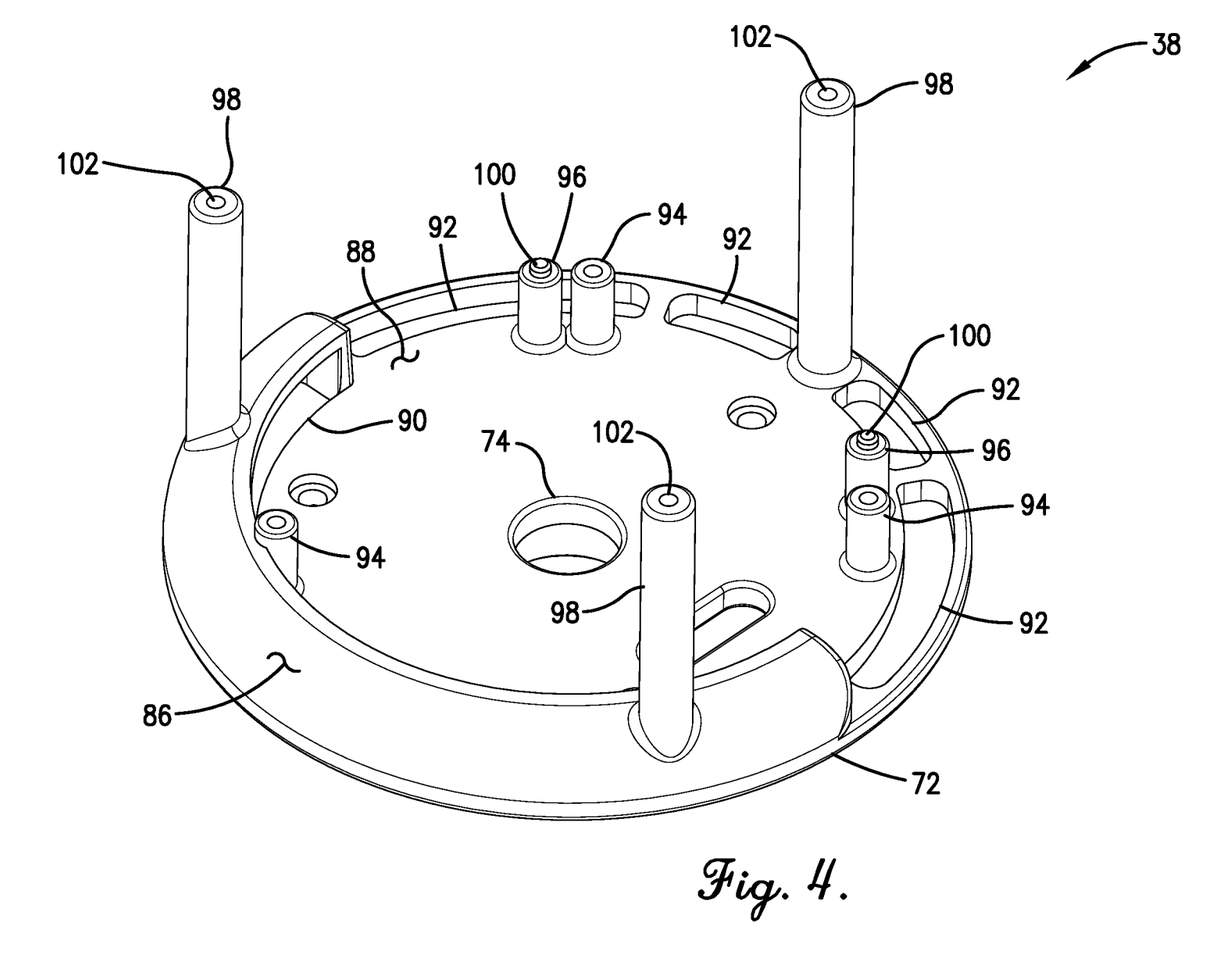
FIG. 4 is a top perspective view of a flow-directing endshield for use with the electric machine shown in FIG. 1.
Figure 5:
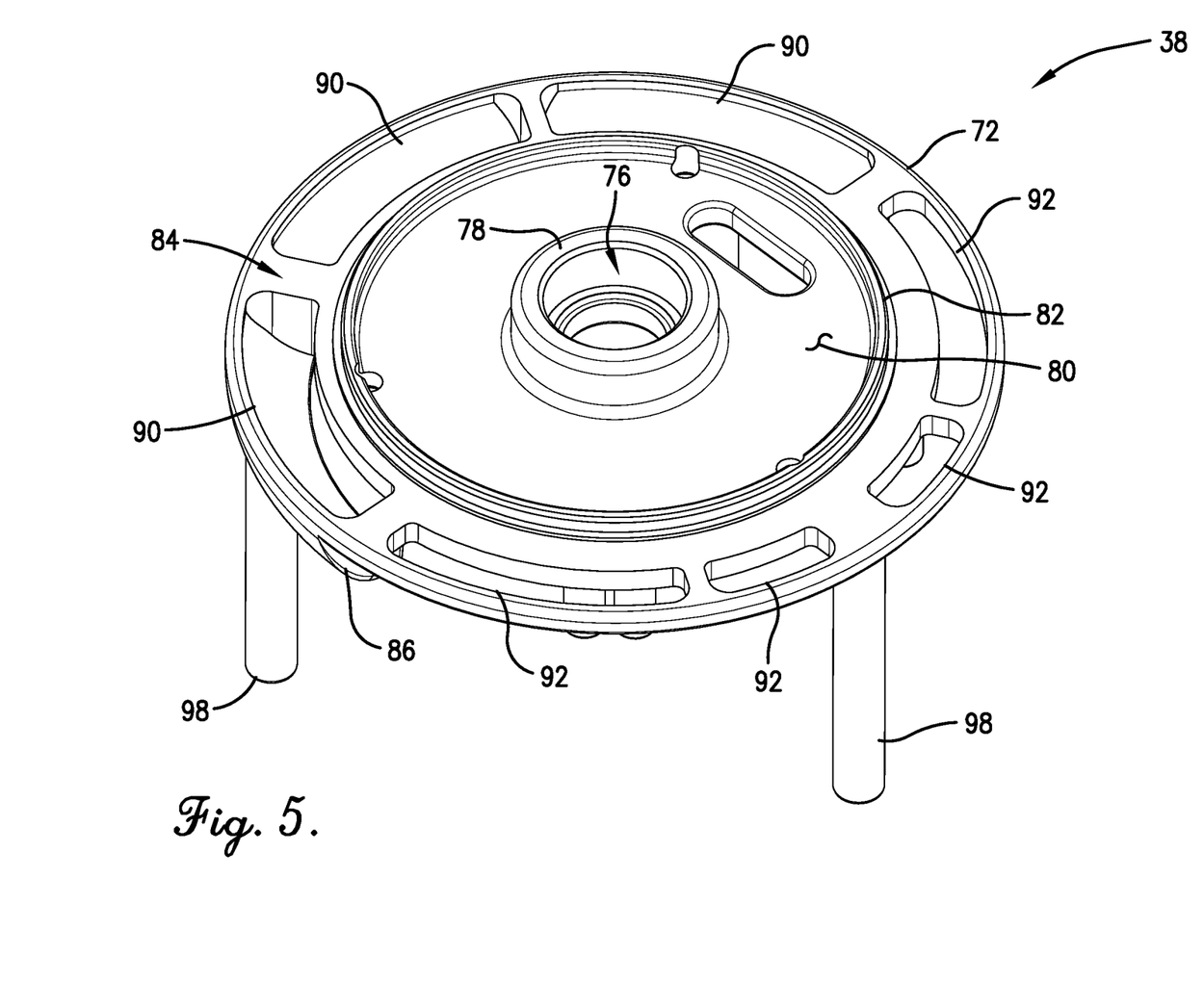
FIG. 5 is a bottom perspective view of the flow-directing endshield shown in FIG. 4.
Figure 6:
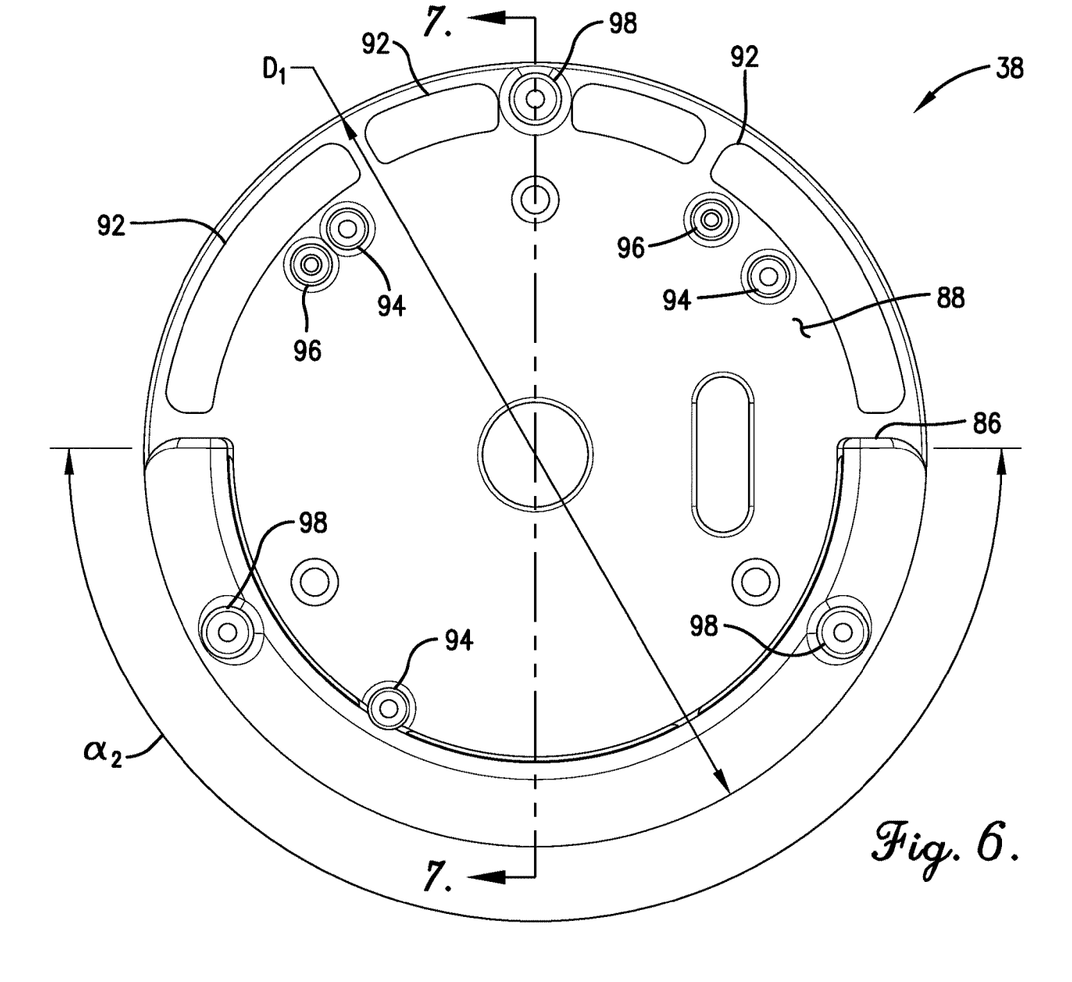
FIG. 6 is a top view of the flow-directing endshield shown in FIG. 4.
Figure 7:
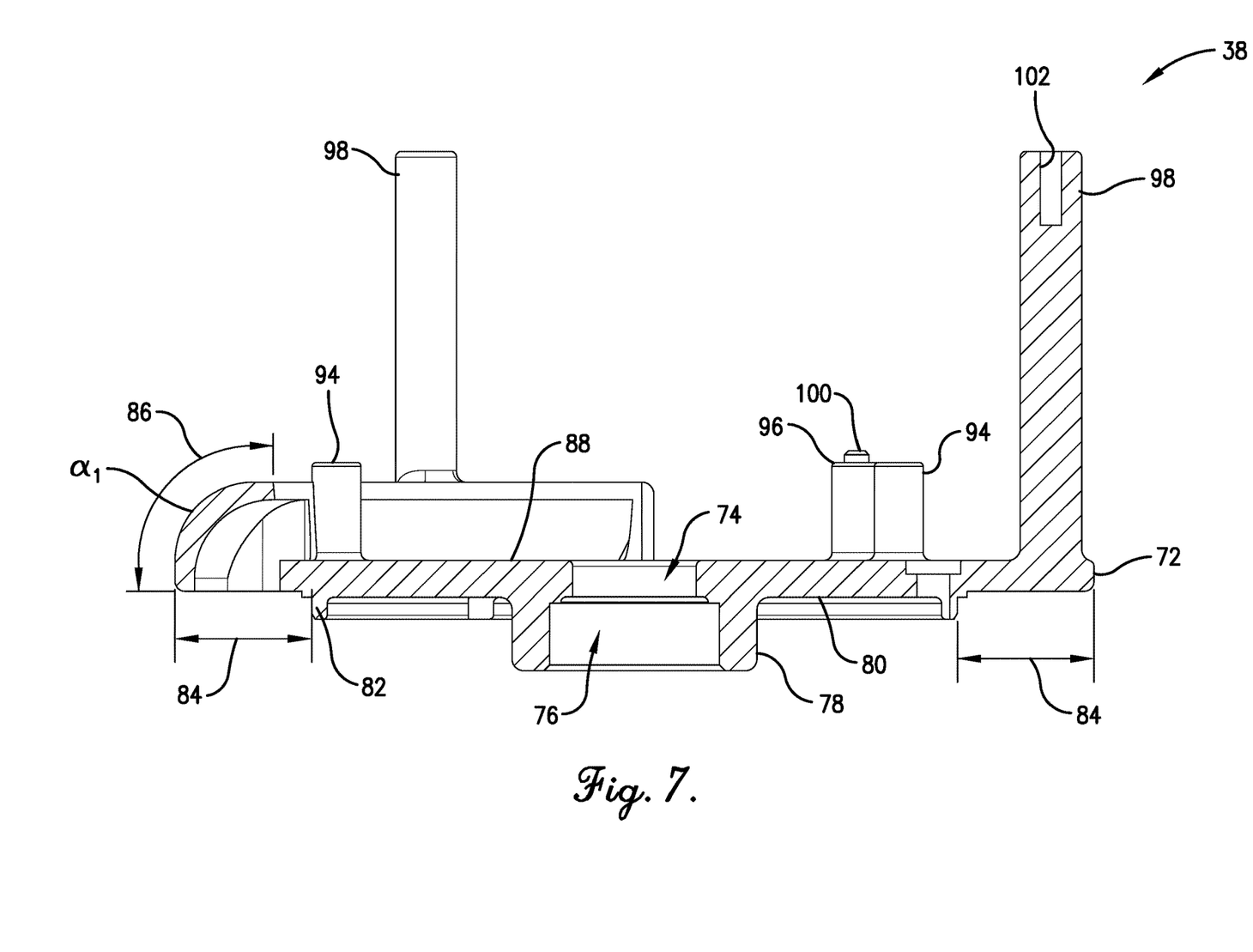
FIG. 7 is a section view of the flow-directing endshield shown in FIG. 4, taken about line 7-7 shown in FIG. 6.

FIG. 4 is a top perspective view of the flow-directing endshield 38, FIG. 5 is a bottom perspective view of the flow-directing endshield 38, FIG. 6 is a top view of the flow-directing endshield 38, and FIG. 7 is a section view of the flow-directing endshield 38, taken about line 7-7 shown in FIG. 6. In the exemplary embodiment, the flow-directing endshield 38 is substantially annular in shape. The flow-directing endshield 38 includes an outermost circular edge 72 having a diameter $D_1$ that is sized to couple to the inner surface 68 of the outer housing 44 via a friction fit. While the diameter $D_1$ can be any selected diameter, in one preferable embodiment, the diameter $D_1$ is about four and sixty-nine hundredths inches (4.69 in.). It is understood that manufacturing tolerances may account for slight variations in the diameter $D_1$ of the outermost circular edge 72. For example, the manufacturing tolerances may be about ±1.5% of the nominal dimension of the part.

The flow-directing endshield 38 includes a central aperture 74 for allowing the shaft 30 of the rotor 18 to pass therethrough. For example, in one aspect of the present invention, the shaft 30 extends through the aperture 74 and is coupled to an encoder 57 positioned proximate the controller 56.

As shown in FIG. 5, the flow-directing endshield 38 includes a bearing pocket 76 for receiving the first bearing assembly 52 therein to rotatably support at least an end of the shaft 30 on the flow-directing endshield 38. The bearing pocket 76 is defined by a first axially extending annular wall 78 extending outward from a bottom surface 80 of the flow-directing endshield 38. The annular wall 78 is formed substantially concentric with the aperture 74.

The flow-directing endshield 38 also includes a second axially extending annular wall 82 positioned radially outward from the annular wall 78. The annular wall 82 is formed substantially concentric with the annular wall 78 and is configured to engage the first shell end 32 of the inner shell 20. In particular, the annular wall 82 is sized to provide a friction fit with an inner surface of the inner shell 20 to facilitate coupling the inner shell 20 to the flow-directing endshield 38. It is noted that in certain aspects of the present invention, the inner shell 20 and the annular wall 82 may define a slip fit wherein the annular wall 82 is configured to locate the flow-directing endshield 38 relative to the inner shell 20.

In the exemplary embodiment, the flow-directing endshield 38 includes an outer periphery 84 that extends radially between the annular wall 82 and the outermost circular edge 72 to at least in part span the fluid channel 50 (shown in FIG. 2). The outer periphery 84 includes a flow deflector 86 that directs a fluid flow radially inward from the fluid channel 50. As shown in FIG. 7, the flow deflector 86 extends at least partially axially upward from a top surface 88 and at least partially radially inward from the outermost circular edge 72, spanning a substantial portion of the outer periphery 84. In the exemplary embodiment, in section, the flow deflector 86 is in the form of a quarter-circle, defining an open arc angle $\alpha_1$ of about ninety degrees (90°). Alternatively, the flow deflector can define an open arc having any selected angle $\alpha_1$, open arcs other than circular in form, or can have other sectional forms, including, for example, a single segment, multiple segments, etc.

Referring to FIG. 6, in the exemplary embodiment, the flow deflector 86 extends arcuately along at least a portion of the outer periphery 84 at an angle $\alpha_2$ of about one hundred and eighty degrees (180°). Alternatively, the flow deflector extends arcuately at any angle $\alpha_2$ that enables the flow-directing endshield 38 to function as described herein. Furthermore, in certain aspects of the present invention, the flow deflector may be segmented, or otherwise include multiple deflectors.

Referring to FIG. 5, the outer periphery 84 of the flow-directing endshield 38 includes a plurality of first and second apertures 90 and 92 for permitting fluid flow from the fluid channel 50 past the flow-directing endshield 38. Each of the apertures 90 and 92 extend arcuately relative to a respective portion of the outermost circular edge 72. In the exemplary embodiment, the apertures 90 and 92 form a discontinuous ring relative to the outermost circular edge 72. The flow deflector 86 is fluidly aligned with the first apertures 90 to receive fluid flow from the fluid channel 50 and turn the fluid flow radially inward.

The flow-directing endshield 38 includes a plurality of axially extending motor controller mounts 94 and 96, and a plurality of axially extending vent plate mounts 98 that project axially beyond the motor controller mounts 94 and 96. Each of the motor controller mounts 94 include an axially extending end portion 100 configured to engage a hole (not shown) in the printed circuit board 58 of the motor controller 56 to facilitate locating the printed circuit board 58. In addition, each of the motor controller mounts 96 include a threaded hole for receiving a fastener (not shown) to secure the printed circuit board 58 thereto. Furthermore, each of the axially extending vent plate mounts 98 include a threaded hole 102 defined therein for receiving a fastener (not shown) to secure the vent plate 64 thereto.

Blower Endshield

Figure 8:
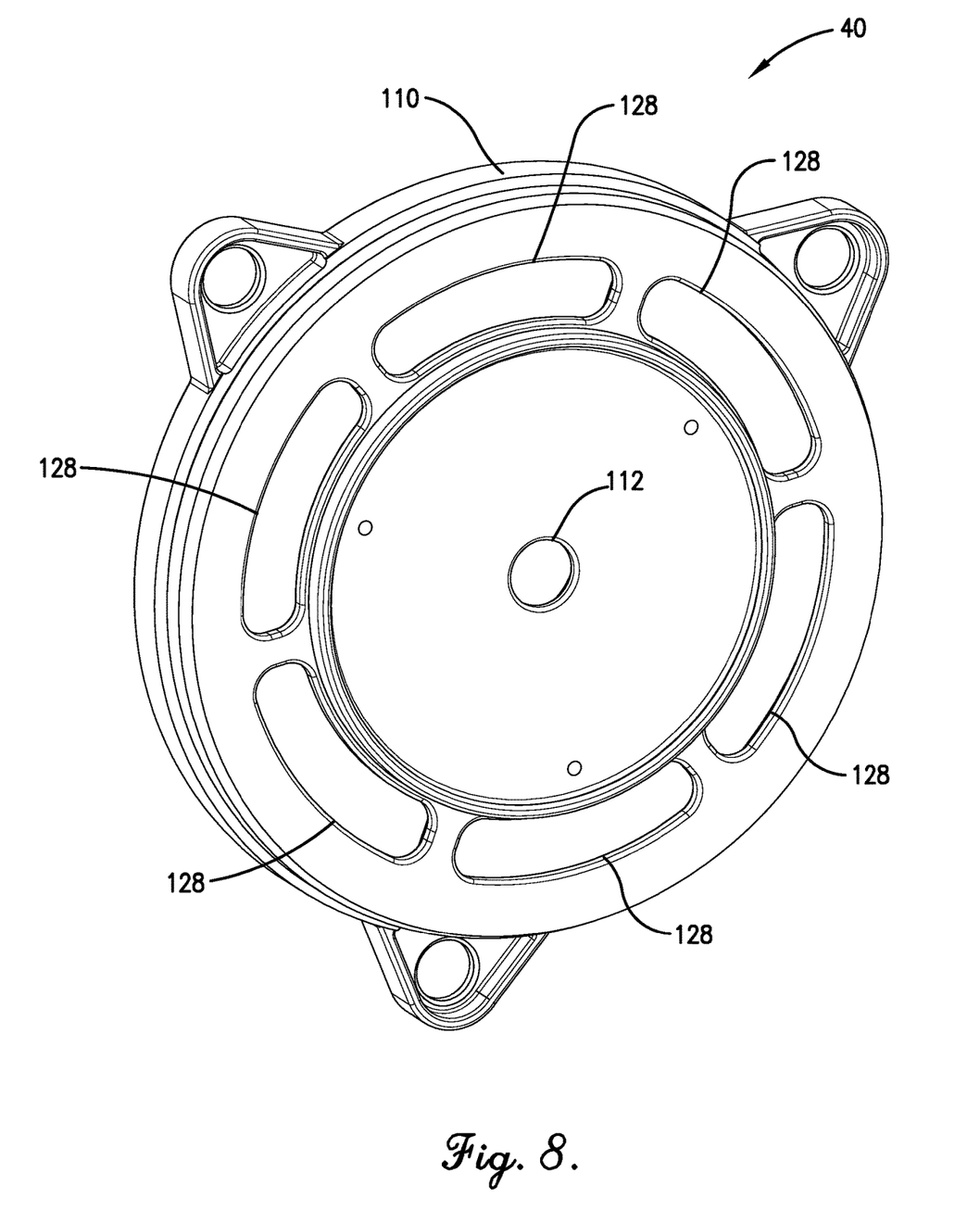
FIG. 8 is a front perspective view of a blower endshield for use with the electric machine shown in FIG. 1.
Figure 9:
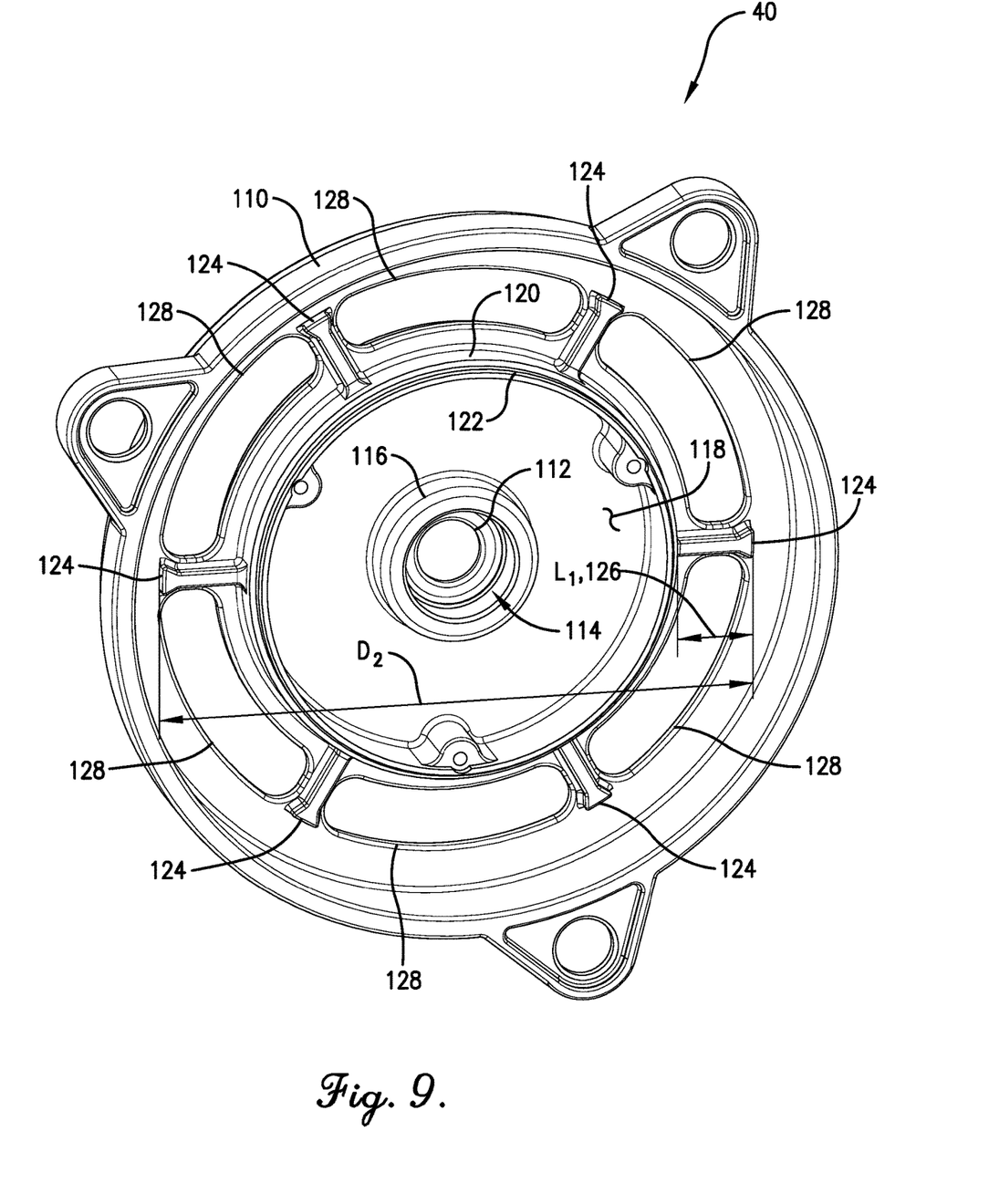
FIG. 9 is a rear perspective view of the blower endshield shown in FIG. 8.

FIG. 8 is a front perspective view of the blower endshield 40, and FIG. 9 is a rear perspective view of the blower endshield 40. In the exemplary embodiment, the blower endshield 40 is substantially annular in shape including an outermost circular edge 110. The blower endshield 40 includes a central aperture 112 for allowing the shaft 30 of the rotor 18 to pass therethrough, beyond the blower endshield 40, for driving connection to the blower 14. In the exemplary embodiment, the blower endshield 40 is configured to couple directly to the blower 14.

As shown in FIG. 9, the blower endshield 40 includes a bearing pocket 114 for receiving the second bearing assembly 54 therein to rotatably support at least an end of the shaft 30 on the blower endshield 40. The bearing pocket 114 is defined by a first axially extending annular wall 116 extending outward from an inner surface 118 of the blower endshield 40. The annular wall 116 is formed substantially concentric with the aperture 112.

The blower endshield 40 also includes a second axially extending annular wall 120 positioned radially outward from the annular wall 116. The annular wall 120 is formed substantially concentric with the annular wall 116 and has a step 122 that is configured to engage the second shell end 34 of the inner shell 20. In particular, the step 122 of the annular wall 120 is sized to provide a friction fit with an inner surface of the inner shell 20 to facilitate coupling the inner shell 20 to the blower endshield 40. It is noted that in certain aspects of the present invention, the inner shell 20 and the step 122 may define a slip fit wherein the step 122 is configured to locate the blower endshield 40 relative to the inner shell 20.

In the exemplary embodiment, the blower endshield 40 includes a plurality of radially extending ribs 124 extending outward from the annular wall 120. The ribs 124 extend a predefined length $L_1$ from the annular wall 120. The length $L_1$ is selected such that a diametrical distance $D_2$ between the outer ends of two diametrically opposite ribs 124 is sized to couple to the inner surface 68 of the outer housing 44 via a friction fit. While the diametrical distance $D_2$ can be any selected measure, in one preferable embodiment, the diametrical distance $D_2$ is about four and sixty-nine hundredths inches (4.69 in.). It is understood that manufacturing tolerances may account for slight variations in the diametrical distance $D_2$. For example, the manufacturing tolerances may be about ±1.5% of the nominal dimension of the measure.

In the exemplary embodiment, the blower endshield 40 includes an outer margin 126, which is substantially defined by the length $L_1$ of the ribs 124. That is, the outer margin 126 extends radially between the annular wall 120 and the outer ends of the ribs 124 to at least in part span the fluid channel 50 (shown in FIG. 2). The outer margin 126 includes a plurality of fluid-flow openings 128 for receiving fluid flow from the blower 14 (e.g., an exhaust air flow). Each of the fluid-flow openings 128 extend arcuately relative to a respective portion of the annular wall 120. In the exemplary embodiment, the fluid-flow openings 128 form a discontinuous ring relative to the annular wall 120. The fluid channel 50 is fluidly aligned with the fluid-flow openings 128 to receive fluid flow from the blower 14.

Vent Plate

Figure 10:
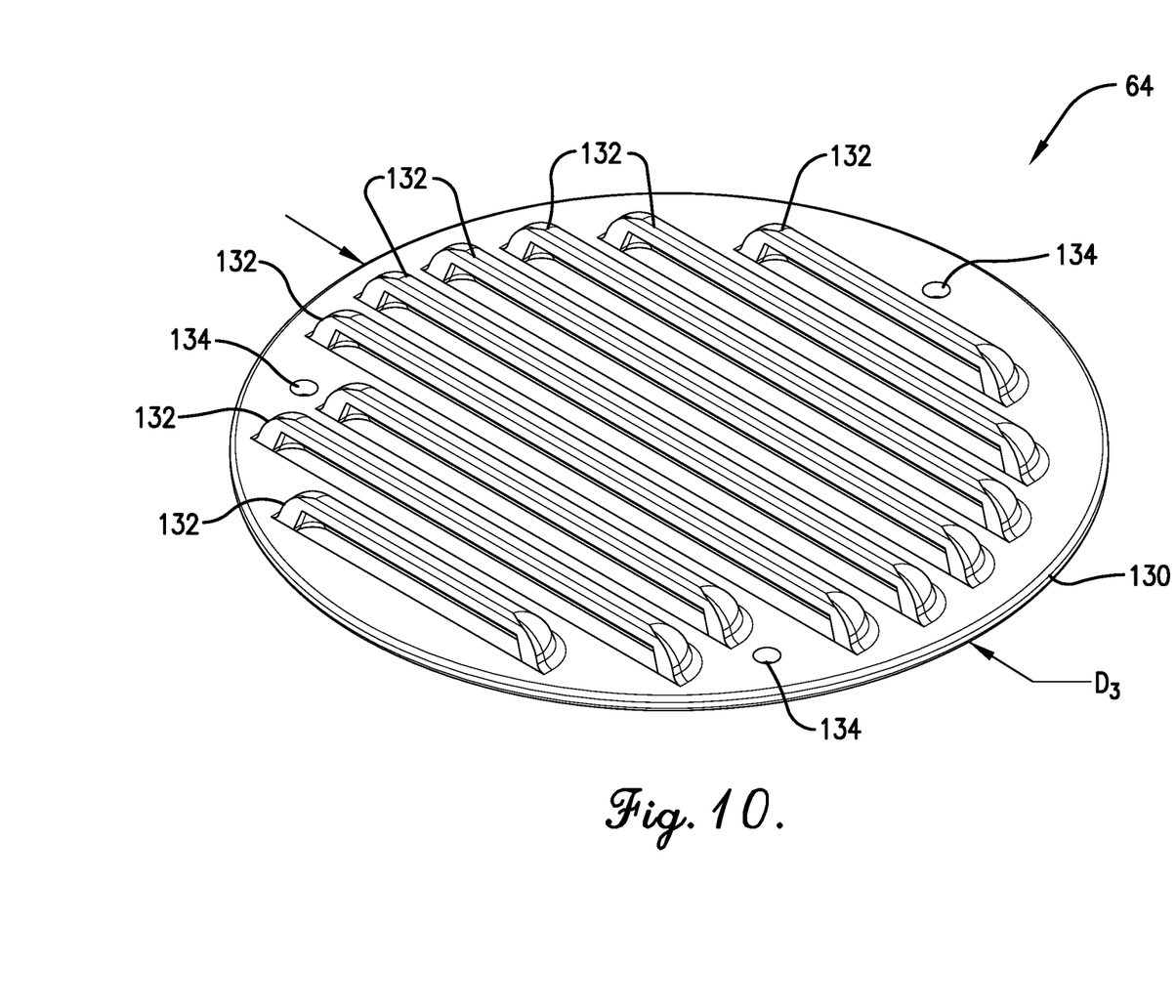
FIG. 10 is a perspective view of a vent plate for use with the electric machine shown in FIG. 1.

FIG. 10 is a perspective view of the vent plate 64, in accordance with one aspect of the invention. In the exemplary embodiment, the vent plate 64 is substantially annular in shape. The vent plate 64 includes an outermost circular edge 130 having a diameter $D_3$ that is substantially equal to an outer diameter of the outer housing 44. The vent plate 64 includes a plurality of vent openings 132 to allow fluid flow relative to the outer housing 44. In the exemplary embodiment, the vent openings 132 are defined by elongated louvers, although other shapes are contemplated. For example, the plurality of vent openings 132 can include one or more apertures, slots, holes, and the like.

In the exemplary embodiment, the vent plate 64 includes a plurality of fastener openings 134. Each fastener opening 134 is aligned with a respective one of the axially extending vent plate mounts 98 of the flow-directing endshield 38. The vent plate 64 is configured to couple directly to the axially extending vent plate mounts 98, for example, via a fastener (not shown).

Cooling of the Motor Controller

Figure 3:
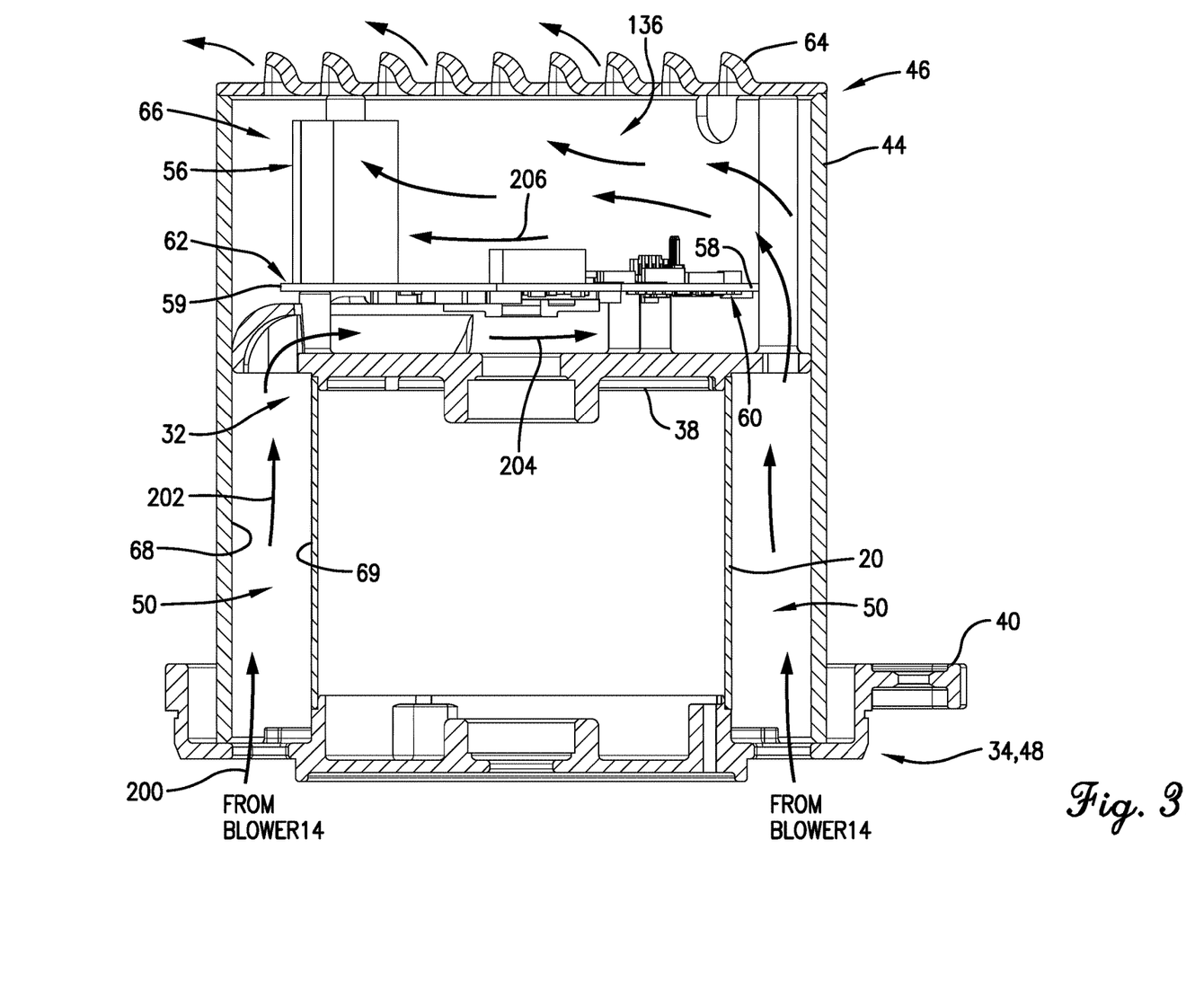
FIG. 3 is a sectional view of a motor assembly shown in FIG. 3, with the stator and rotor removed for clarity.

FIG. 3 is a sectional view of the motor assembly 12, with the stator 16 and the rotor 18 removed for clarity. In the exemplary embodiment, the motor assembly 12 is preferably configured to be operable at temperatures in the range between and including about negative forty (−40) degrees Celsius and about eighty-five (85) degrees Celsius. Such a high operational temperature, in addition to heat generated by the electronic components of the motor controller 56 and other components of the motor assembly 12, make it desirable to cool the motor controller 56 and associated structures.

As described herein, the outer housing 44 at least partly surrounds the inner shell 20 such that the axially extending fluid channel 50 is defined therebetween. More particularly, in the exemplary embodiment, the inner surface 68 of the outer housing 44 is spaced entirely apart from the outer circumferential surface 69 of the inner shell 20 to define the fluid channel 50. In a preferred embodiment, the inner surface 68 and the outer circumferential surface 69 are substantially cylindrical in shape and concentric such that the fluid channel 50 is annular.

As shown in FIG. 3, the flow-directing endshield 38 is spaced axially inward from the first housing end 46 such that the fluid channel 50 extends axially along only part of the outer housing 44. Furthermore, the flow-directing endshield 38 is fluidly interposed between the fluid channel 50 and the motor controller 56 and configured to direct fluid flow between the fluid channel 50 and the motor controller 56.

As described above, the motor controller 56 includes the board 58 having opposite first and second radially extending board sides 60 and 62. As shown in FIG. 3, the board includes an outermost peripheral board edge 59 that is spaced inward from the inner surface 68 of the outer housing 44 to enable the fluid flow to pass by the board 58.

As described herein, the blower endshield 40 receives fluid flow directly from the blower 14. The fluid flow preferably includes exhaust air from the blower 14. However, in certain aspects of the present invention, it is contemplated that the fluid flow is non-exhaust air, an alternative non-air gas (e.g., a refrigerant gas), or even a liquid or mixed fluid (e.g., a vapor) from the blower. Furthermore, in other aspects of the present invention, the fluid flow could be intake air of the blower, in which case the direction of the flow path (introduced below) is reversed. Moreover, in further aspects of the present invention, it is contemplated that the fluid flow is from a non-blower source (e.g., as would be the case for certain non-vacuum motor alternative embodiments).

In the exemplary embodiment, the housing 70 assembly (shown in FIG. 2) and the motor controller 56 cooperatively direct fluid flow received from the blower 14 along a flow path 200 that extends along the inner shell 20 and the motor controller 56. The fluid flow is operable to remove heat from the inner shell 20 (e.g., heat generated by the stator 16 and rotor 18) and the motor controller 56 by means including convection.

In the exemplary embodiment, the first board side 60 is spaced from the flow-directing endshield 38 a distance defined by the motor controller mounts 94 and 96. Furthermore, the second board side 62 is spaced from the vent plate 64 such that a substantially unobstructed, open space 136 is provided in controller chamber 66 between the second board side 62 and the vent plate 64. As such, the motor controller 56 is provided with dual-sided spacing such that at least a portion of the flow path 200 extends along each of the first and second board sides 60 and 62 of the motor controller 56. That is, the flow path 200 includes an intermediate portion 204 and a downstream portion 206, respectively, extending generally along respective ones of the first and second board sides 60 and 62 of the motor controller 56.

In the exemplary embodiment, the axially extending fluid channel 50 defines the upstream portion 202 of the flow path 200. The intermediate portion 204 of the flow path 200 is generally cooperatively defined by the top surface 88 of the flow-directing endshield 38 and the first board side 60. The second board side 62 and the vent plate 64 generally cooperatively define the downstream portion 206 of the flow path 200.

Thus, a fluid flow from the blower 14 is received at the fluid-flow openings 128 of the blower endshield 40 and directed generally axially along the upstream portion 202 of the flow path 200 by the inner shell 20 and the outer housing 44 (e.g., along the fluid channel 50 defined therebetween). A portion of the fluid flow continues generally axially past the flow-directing endshield 38 via the second apertures 92, while another portion of the fluid flow is channeled in a generally radial direction by the by the flow deflector 86 to the intermediate portion 204 of the flow path 200. As controlled by the motor controller 56 and the flow-directing endshield 38, the generally radial flowing fluid flow then continues generally along the intermediate portion 204. Because the outermost peripheral board edge 59 is spaced inward from the inner surface 68 of the outer housing 44, the fluid flow along the intermediate portion 204 is changed from its generally radial direction to flow generally axially past the motor controller 56. As controlled by the vent plate 64 and the second board side 62, the fluid flow is channeled generally along the downstream portion 206, across the second board side 62, before being expelled from the housing assembly 70 via the plurality of vent openings 132.

Advantageously, embodiments of the present invention address cooling a motor controller using air flow generated by a blower powered by the motor assembly. This enables the motor assembly to be manufactured in a smaller size, operated in higher environmental temperatures, and built for a decreased cost. By decreasing the motor assembly size, reductions in weight, power requirements, and cost may be realized. Moreover, enabling operation of the motor assembly in higher temperatures extends the use cases for the motor assembly, facilitating use in conditions previously prohibited.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

Those of ordinary skill in the art will appreciate that any suitable combination of the previously described embodiments may be made without departing from the spirit of the present invention.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A motor assembly for powering a fluid blower, said motor assembly comprising:
   a stator;
   a rotor rotatable relative to the stator about an axis of rotation;
   an inner shell presenting axially opposite first and second shell ends and enclosing, at least in part, the stator and rotor;
   an outer housing at least partly surrounding the inner shell such that an axially extending fluid channel is defined therebetween;
   a motor controller positioned within the outer housing and configured to control at least one operational parameter of the motor assembly; and
   a flow-directing endshield located within the outer housing adjacent the first shell end, with the rotor being at least in part supported by the flow-directing endshield,
   said flow-directing endshield fluidly interposed between the fluid channel and motor controller and configured to direct fluid flow between the fluid channel and the motor controller.

2. The motor assembly as claimed in claim 1, further comprising:
   a second endshield adjacent the second shell end, with the rotor being supported by the endshields,
   said second endshield having at least one fluid-flow opening in communication with the fluid channel, with the fluid-flow opening being configured communicate with the fluid blower.

3. The motor assembly as claimed in claim 2,
   said rotor including a shaft projecting axially outward beyond the second endshield for driving connection to the blower,
   said second endshield being configured to couple directly to the blower.

4. The motor assembly as claimed in claim 3,
   said endshields including respective bearing pockets; and
   bearings received in respective bearing pockets to rotatably support the shaft on the endshields.

5. The motor assembly as claimed in claim 2,
   said outer housing presenting axially opposite first and second housing ends,
   said flow-directing endshield being spaced axially inward from the first housing end,
   said motor controller being axially located at least in part between the flow-directing endshield and the first housing end.

6. The motor assembly as claimed in claim 5,
   said second endshield being coupled to the second shell end and the second housing end,
   said second endshield presenting an outer margin that extends radially between the inner shell and the outer housing to at least in part span the fluid channel,
   said fluid-flow opening being defined in the outer margin.

7. The motor assembly as claimed in claim 6,
   said second endshield and said second housing end being intercoupled via a friction fit.

8. The motor assembly as claimed in claim 5,
   said first shell end being spaced axially inward from the first housing end,
   said flow-directing endshield being coupled to the first shell end and presenting an outer periphery that extends radially between the inner shell and the outer housing to at least in part span the fluid channel,
   said outer periphery including a flow deflector that directs fluid flow radially relative to the fluid channel.

9. The motor assembly as claimed in claim 5, further comprising:
   a vent plate closing the first housing end,
   said vent plate including at least one vent opening to allow fluid flow relative to the outer housing.

10. The motor assembly as claimed in claim 9,
said vent plate including a plurality of elongated louvers defining the at least one vent opening.

11. The motor assembly as claimed in claim 9,
said flow-directing endshield including a plurality of axially extending vent plate mounts that project axially beyond the motor controller,
said vent plate being secured to the vent plate mounts.

12. The motor assembly as claimed in claim 11,
said first shell end being spaced inwardly from the first housing end,
said flow-directing endshield being coupled to the first shell end,
said second endshield being coupled to the second shell end and the second housing end,
said outer housing being held between the second endshield and the vent plate.

13. The motor assembly as claimed in claim 1,
said inner shell presenting an outer circumferential surface,
said outer housing presenting an inner circumferential surface,
said fluid channel being defined between the circumferential surfaces so as to extend circumferentially.

14. The motor assembly as claimed in claim 13,
said circumferential surfaces being spaced entirely apart such that the fluid channel is circumferentially continuous.

15. The motor assembly as claimed in claim 14,
said circumferential surfaces being cylindrical in shape and concentric such that the fluid channel is annular,
said outer housing presenting axially opposite first and second housing ends,
said first shell end being spaced axially inward from the first housing end such that the fluid channel extends axially along only part of the outer housing.

16. The motor assembly as claimed in claim 1,
said motor controller including a board presenting opposite first and second radially extending board sides,
said flow-directing endshield including a flow deflector that directs fluid flow radially relative to the fluid channel to at least one of the board sides.

17. The motor assembly as claimed in claim 1,
said flow-directing endshield including a flow deflector that directs fluid flow radially relative to the fluid channel.

18. The motor assembly as claimed in claim 17,
said flow-directing endshield presenting an outer periphery that extends radially between the inner shell and the outer housing to at least in part span the fluid channel,
said outer periphery including the flow deflector,
said outer periphery further including a plurality of apertures for permitting fluid flow relative to the fluid channel past the flow-directing endshield,
said flow deflector being fluidly aligned with at least one of the apertures.

19. The motor assembly as claimed in claim 18,
said motor controller including a board presenting axially opposite first and second radially extending board sides,
said board presenting an outermost peripheral board edge,
said outer periphery of the flow-directing endshield extending radially outward beyond the board edge.

20. The motor assembly as claimed in claim 19,
said outer periphery of the flow-directing endshield presenting an outermost circular edge,
said flow deflector extending arcuately along at least part of the circular edge,
each of said apertures extending arcuately relative to a respective portion of the circular edge,
at least a number of said apertures forming a discontinuous ring relative to the circular edge.

\* \* \* \* \*